United States Patent [19]

Weetall

[11] 3,870,543

[45] Mar. 11, 1975

[54] METHOD OF BONDING HYDROXYQUINOLINE TO AN INORGANIC MATERIAL

[75] Inventor: Howard H. Weetall, Elmira, N.Y.

[73] Assignee: Corning Glass Works, Corning, N.Y.

[22] Filed: July 9, 1973

[21] Appl. No.: 377,626

[52] U.S. Cl............... 117/54, 117/62.1, 117/98, 117/69, 117/100 S, 117/118, 117/124 D, 210/263

[51] Int. Cl........................ B44d 1/20, C03c 17/28

[58] Field of Search............. 117/62.1, 47 R, 123 C, 117/124 D, 118, 54, 100 S, 98; 253/438; 210/263

[56] References Cited
UNITED STATES PATENTS 3,482,927  12/1969  O'Brien............................. 117/62.1
3,484,390  12/1969  Bauman et al...................... 260/2.2

*Primary Examiner*—William D. Martin
*Assistant Examiner*—Janyce A. Bell
*Attorney, Agent, or Firm*—James A. Giblin; Clarence R. Patty, Jr.

[57] ABSTRACT

8-Hydroxyquinoline (oxine) is coupled chemically to a high surface area inorganic support material by first treating an essentially water-insoluble inorganic material having surface hydroxyl or oxide groups with a cyanogen halide solution to form surface reactive groups. The surface groups are then reacted with benzidine. The free amino group on the coupled benzidine residue is then diazotized and contacted with a solution of 8-hydroxyquinoline to bond the chelating agent to the inorganic material through the intermediate benzidine residue. The composite product can be used to extract ions such as $Fe^{+3}$ from solution.

7 Claims, No Drawings

METHOD OF BONDING HYDROXYQUINOLINE TO AN INORGANIC MATERIAL

BACKGROUND OF THE INVENTION

1. Related Applications

U.S. patent application Ser. No. 377,628, filed of even date herewith in the name of H. H. Weetall and entitled "Porous Inorganic Support Materials Having Surface Imino Groups" and U.S. patent application Ser. No. 227,204, filed Feb. 17, 1972 and now abandoned, in the names of G. D. Schucker et al., and entitled "Chelating Agents Coupled to Inorganic Carriers," both applications assigned to the present assignee.

2. Field

This invention relates to immobilized chelating agents and methods of preparing and using them. More specifically, the invention is concerned with a novel method of immobilizing 8-hydroxyquinoline by bonding it to a high surface area inorganic carrier material in such a manner that the chelating agent retains its ability to complex ions in solution.

3. Prior Art 8-hydroxyquinoline (also known as oxine) is a well known chelating agent which can complex with such ions as those of iron, molybdenum, copper, zirconium, vanadium, tungsten, and titanium in solution, thereby removing the ions from solution. Inasmuch as the chelating agent itself or the chelate formed therewith are difficult to remove from solution, attempts have been made in recent years to develop methods of immobilizing or insolubilizing the chelating agent on high surface area support materials which are essentially water-insoluble and hence, easy to remove from a solution. However, in bonding oxine to a carrier material, care must be taken to assure that the chelating agent does not lose its ability to specifically complex with ions. In U.S. Pat. No. 3,484,390, issued to A. J. Bauman et al., there are disclosed methods of bonding oxine to various derivatives of cellulose in such a manner that the bonded oxine retains its ability to complex with ions. In U.S. patent application Ser. No. 227,204, filed in the names of G. D. Schucker et al., on Feb. 17, 1972, there are disclosed methods of bonding oxine to such inorganic carriers as porous glass particles through silane coupling agents. As disclosed in the above patent application, oxine can be successfully bonded to high surface area porous glass particles and then the composite product can be used to successfully extract ferric ions and other ions from solution. Further, once the ions have complexed with the immobilized chelating agent, they can be subsequently eluted, thereby permitting reuse of the composite consisting of the chelating agent (oxine) coupled to the porous glass through the intermediate silane. As disclosed in the above-described patent application, various advantages have been found in using inorganic carriers instead of organic carriers for the immobilization of chelating agents. For example, inorganic carriers are generally more rigid, non-swellable, not subject to microbial attack, are relatively easy to sterilize, and, they are commonly easier to handle, store and use. In some cases, the inorganic carriers are even less expensive than organic carriers of comparable surface area.

In the above patent application, the disclosed methods for immobilizing the various chelating agents require the use of silane coupling agents, hereinafter referred to as silanes. The preferred silanes are molecules having two reactive portions. One portion preferentially reacts with inorganic substances under appropriate conditions. The other portion reacts, or can be tailor-made to react, with organic molecules. Thus, the silanes are used to serve as intermediate compounds linking inorganic materials such as glass surfaces to a wide variety of organic materials such as enzymes, antibodies, antigens, coenzymes, chelating agents, and the like. By carefully choosing an appropriate organo-functional portion on the silane, it has been found possible to chemically couple the above substances to inorganic carrier materials in such a manner that the coupled substance retains its useful properties (e.g., catalysis, complexing, etc.). However, the use of silanes commonly requires tedious, time-consuming multi-step procedures. Further, it is known that some silanes can polymerize on the surface of inorganic carriers, thus making it difficult to control the distance between the surface of the inorganic carrier and the substance bonded through the silane to that surface. Accordingly, attempts have been made to find a simpler, less tedious and economical method for bonding (chemically, via covalent bonds) chelating agents such as oxine to high surface area inorganic carriers in such a manner that the chelating agent does not lose its ability to complex with ions. Quite surprisingly, I have now found such a novel method for chemically bonding oxine to inorganic surfaces.

SUMMARY OF THE INVENTION

I have found that 8-hydroxyquinoline can be chemically bonded to an inorganic material in such a manner that the chelating agent retains its ability to complex with $Fe^{+3}$ ions and remove them from solution. Generally, my method of bonding 8-hydroxyquinoline to inorganic support materials comprises the steps of: (a) reacting a high surface area, essentially water-insoluble inorganic material having available surface hydroxyl or oxide groups with an aqueous solution of a cyanogen halide; (b) removing the material from the solution; (c) reacting the material with benzidine to couple a benzidine residue to the surface of the material through one of the amine groups on the benzidine, said benzidine residues having attached thereto free amino groups; (d) diazotizing the remaining amine groups on the benzidine residues; and (e) reacting the diazotized product with an aqueous solution of 8-hydroxyquinoline to chemically couple the chelating agent to the inorganic carrier through a benzidine residue. Preferably, the method comprises using porous glass particles as the carrier. The preferred cyanogen halide is cyanogen bromide and the amount of cyanogen bromide in the treating solution comprises between about 20 and 100 percent of the weight (dry) of the carrier treated, with the pH of the treating solution maintained between about 9.0 and 12.0.

SPECIFIC EMBODIMENTS

The inorganic carriers which can be used to chemically couple the 8-hydroxyquinoline should be essentially water-insoluble materials having a high surface area and available surface oxide or hydroxyl groups. The surface area should be at least about 5 $M^2/g$ and preferably at least 50 $M^2/g$. Such high surfaces can be found, for example, in porous glass particles known as Corning Code GZO–3900 porous glass particles (550A average pore size, surface area about 70 $M^2/g$) and zirconia-coated porous glass particles known as Corning Code MZO-3900 zirconia-clad porous glass particles (550A average pore size, surface area about 83 M²/g). Such "zirconia-coated" or "zirconia-clad" porous glass particles can be made in accordance with the teachings of U.S. patent application Ser. No. 227,205, now U.S. Pat. No. 3,783,101, filed in the names of W. Tomb and H. H. Weetall on Feb. 17, 1972, and assigned to the present assignee. Porous glass particles can be made in accordance with the teachings of U.S. Pat. No. 3,549,524 issued to W. Haller or U.S. Pat. No. 3,485,687 issued to I. Chapman.

In preferred embodiments, the inorganic carriers comprise porous particles having an average particle size between about 20 to 80 mesh (177 to 840 microns) and an average pore diameter between about 30 to 1000A.

Prior to treatment with the cyanogen halide solution, care must be taken to assure that there are available surface hydroxyl or oxide groups on the inorganic carrier. Generally, such surface groups can be assured by starting with clean dry surfaces of, if necessary, by cleaning the carrier (e.g., dilute acid wash followed by drying slightly over 100°C.).

The clean carrier is then contacted or treated with an aqueous solution of a cyanogen halide, preferably cyanogen bromide, for about 5 minutes or more, preferably for about an hour, to form surface reactive groups on the carrier which can subsequently react with one of the amino groups on benzidine molecule. The cyanogen halide solution should be maintained within a pH range of about 9.0 to 12.0 and this can be done with drop additions of NaOH. The concentration of the cyanogen halide solution should be such that the amount of cyanogen halide in the aqueous solution is between about 20 to 100 percent the dry weight of the carrier to be treated (e.g., about 0.2 to 1.0 g of cyanogen bromide per gram of dry carrier treated).

After the inorganic carriers have been surface-treated with the cyanogen halide solution to form surface active groups, the treated carrier is reacted with benzidine (very slightly water-soluble) in water at room temperature, preferably for at least about two hours. Once the benzidine has reacted with the surface groups on the treated carrier, the free amino group on the benzidine residue can be diazotized by known means for subsequent reaction with the 8-hydroxyquinoline to bond the chelating agent covalently to the carrier surface through the intermediate benzidine residue. The exact locus on the chelating agent molecule where the azo linkage occurs is not known. However, a covalent linkage between the 8-hydroxyquinoline and the inorganic carrier does occur and the resulting composite has been found useful, as described below, in extracting $Fe^{+3}$ ions from solution. It should also be pointed out that the exact method of "chelation" or complexing is not fully understood in the case of chelates which have been immobilized on rigid support materials. For a more detailed description of one or more of the possible mechanisms under which an immobilized chelating agent such as 8-hydroxyquinoline can complex with various ions, see U.S. patent application Ser. No. 227,204, filed on Feb. 17, 1972, and referred to above as a related application.

In the examples below, 8-hydroxyquinoline was chemically coupled to zirconia-coated porous glass particles, as described, through a benzidine residue linkage. The resulting composite comprising 8-hydroxyquinoline bonded to the inorganic carrier through a benzidine residue was then used to extract $Fe^{+3}$ ions from solution. The results with the above composite were compared with the results obtained with an appropriate control composite consisting of identical zirconia-coated porous glass particles which had not been surface-treated or contacted with benzidine or the chelating agent. Another control composite consisted of identical inorganic particles which had been surface-treated with the cyanogen halide solution and reacted with benzidine, but not diazotized or reacted with the chelating agent.

The preferred volume of the aqueous solution containing the benzidine used to react with the surface-treated carrier is about two times the volume of the glass and the ratio of benzidine-containing solution to volume of carrier was used in the example below.

EXAMPLE

One gram of zirconia-coated porous glass particles (Corning Code MZO-3900) having a mesh size of 20 to 80 mesh, U.S. Standard Sieve, and an average pore diameter of 550A was added to a 10 ml. solution consisting of 0.2g cyanogen bromide in water at 20°C. The cyanogen bromide solution was maintained at pH 11.0 with drop additions of dilute NaOH solution and the reaction was allowed to proceed for about 30 minutes. The surface-activated carrier was then removed from the treating solution and washed in ice cold water. After washing, the surface-treated carrier was reacted with a solution/mixture of 10 mg of benzidine in 10 ml. of water. The pH was maintained at 9.0 with drops of NaOH solution. Although benzidine is an essentially water-insoluble solid, sufficient amounts do dissolve for reaction with the treated carrier.

The surface-treated carrier, having the benzidine residues attached thereto was then removed from the treating solution/mixture and the remaining amino groups on the attached benzidine residues were diazotized as follows at 0°C. in an ice bath:

About 10 ml. of 2N HCl were added to the one gram of carrier having the benzidine residues attached thereto. Next, 0.25g of solid $NaNO_2$ was added and the entire reaction mixture was placed in a desiccator to which an aspirator was connected to remove air and gas bubbles in the porous particles. The diazotization procedure was continued for twenty minutes with the container for the reactants packed in ice.

The particles were then removed, placed on a filter in a Beuchner funnel and washed with ice cold water containing 1 percent sulfamic acid. The diazotized carrier was then placed in a 1 percent (by weight) solution of 8-hydroxyquinoline in 10 ml. of water. The reaction, maintained at pH of 8.0 to 9.0 with NaOH drops, was continued for about 1 hour. The reaction product (carrier having the chelating agent attached thereto via the intermediate benzidine residue) was removed and washed with acetone, air dried, and stored in a tightly closed bottle.

Static Extraction of $Fe^{+3}$ Ions

The 1 gram quantity of the immobilized chelating agent prepared in accordance with the example was added to a solution consisting of 104 micrograms (μg) of $Fe^{+3}$ in 10 ml. of water and allowed to extract the $Fe^{+3}$ ions for 1 hour. A control sample of one gram of identical zirconia-coated glass particles was placed in a similar solution for the same amount of time. Both solutions were at room temperature. After 1 hour, the supernatant fluids were analyzed for $Fe^{+3}$ to determine how much $Fe^{+3}$ had been extracted by the respective samples. Both samples were used to extract $Fe^{+3}$ from solutions maintained at pH 4.0 and pH 5.0 to note the effect of pH change on the amount of $Fe^{+3}$ extracted. The results are shown in Table I below where the amount of $Fe^{+3}$ (in micrograms extracted by each sample at the indicated pH) is shown.

TABLE I

| Extraction pH | Oxine Bonded to Carrier ($\mu$g $Fe^{+3}$ extracted) | Control ($\mu$g $Fe^{+3}$ extracted) |
| --- | --- | --- |
| 4.0 | 45 | 25 |
| 5.0 | 32 | 25 |

Flow-Through Extraction of $Fe^{+3}$

Another 1 gram quantity of the immobilized 8-hydroxyquinoline prepared as in the example, was placed in a flow-through column through which a solution consisting of 2,500 $\mu$g of $Fe^{+3}$ in 100 ml. of water was passed one time.

Additional flow-through columns were prepared containing 1 gram each of untreated zirconia-coated glass particles identical to those used as the carrier for the chelating agent and the same carrier which had been treated with the cyanogen bromide solution followed by further surface treatment with the benzidine. Again, the extraction procedures took place with separate $Fe^{+3}$ solutions maintained at pH 4.0 and pH 5.0. The $Fe^{+3}$ solutions were passed through all columns one time at the indicated pH with the results shown in Table II where the amount of $Fe^{+3}$ ($\mu$g) extracted with each column at each pH is indicated.

TABLE II

| Extraction pH | (1) Immobilized Oxine ($\mu$g $Fe^{+3}$ extracted) | (2) Zirconia-Coated Porous Glass ($\mu$u $Fe^{+3}$ extracted) | (3) (2) With Benzidine Residue ($\mu$g $Fe^{+3}$ extracted) |
| --- | --- | --- | --- |
| 4.0 | 1120 | 130 | 180 |
| 5.0 | 800 | 130 | 192 |

The respective amounts of $Fe^{+3}$ extracted were determined by analyzing the $Fe^{+3}$ solution for $Fe^{+3}$ after one pass through each of the columns.

The above results indicate that 8-hydroxyquinoline, also known as 8-quinolinol, can be bonded to a high surface area carrier in such a manner, as described, that the resulting composite can be used to extract ions from solution.

Inasmuch as the above-described method of bonding the chelating agent to high surface area inorganic carrier materials is subject to minor modifications without departing from the scope of this invention, it is intended that the above example be construed as merely illustrative and not limiting.

I claim:

1. A method of chemically bonding 8-hydroxyquinoline to an inorganic material which comprises the steps of:
    a. reacting with an aqueous solution of cyanogen bromide an essentially water-insoluble inorganic material having surface hydroxyl or oxide groups and a surface area of at least 5 $M^2$/gram, the inorganic material being selected from the group consisting of porous glass and zirconia-coated porous glass;
    b. removing the material from the solution;
    c. reacting the material with a benzidine solution to couple benzidine residues on the surface of the material, said benzidine residues having attached thereto free amino groups;
    d. diazotizing the free amino groups; and
    e. reacting the material having the diazotized groups attached thereto with an aqueous solution of 8-hydroxyquinoline.

2. The method of claim 1 wherein the high surface area inorganic material has a surface area of at least 50 $M^2$/gram.

3. The method of claim 1 wherein the inorganic material used comprises zirconia-coated porous glass particles having an average pore diameter between 30 and 1,000 A.

4. The method of claim 2 wherein the cyanogen bromide solution of step (a) comprises an amount of cyanogen bromide which is between about 20 and 100 percent of the dry weight of the material to be treated.

5. The method of claim 4 wherein the pH of the solution of step (a) is maintained between about 9.0 and 12.0.

6. The method of claim 5 wherein the concentration of the 8-hydroxyquinoline of step (e) is about 1 percent by weight in water.

7. The product produced according to the method of claim 1.

* * * * *